(12) United States Patent
Glaros et al.

(10) Patent No.: US 10,496,558 B2
(45) Date of Patent: Dec. 3, 2019

(54) MODULAR DEVICE, SYSTEM, AND METHOD FOR RECONFIGURABLE DATA DISTRIBUTION

(71) Applicant: Synexxus, Inc., Arlington, VA (US)

(72) Inventors: Gregory Emil Glaros, McLean, VA (US); John T. Reep, Alexandria, VA (US); James M. Wimbrow, Oak Hall, VA (US)

(73) Assignee: SYNEXXUS, INC., Arlington, VA (US)

( * ) Notice: Subject to any disclaimer, the term of this patent is extended or adjusted under 35 U.S.C. 154(b) by 0 days.

(21) Appl. No.: 15/705,681

(22) Filed: Sep. 15, 2017

(65) Prior Publication Data

US 2018/0173647 A1    Jun. 21, 2018

Related U.S. Application Data

(63) Continuation of application No. 14/046,030, filed on Oct. 4, 2013, now Pat. No. 9,767,046.

(51) Int. Cl.
*G06F 13/10* (2006.01)
*G06F 13/40* (2006.01)
*G06F 1/3215* (2019.01)
*G06F 9/4401* (2018.01)

(52) U.S. Cl.
CPC .......... *G06F 13/10* (2013.01); *G06F 13/4022* (2013.01); *G06F 1/3215* (2013.01); *G06F 9/4411* (2013.01)

(58) Field of Classification Search
CPC ...... G06F 1/3215; G06F 9/4411; G06F 13/10; G06F 13/4022
See application file for complete search history.

(56) References Cited

U.S. PATENT DOCUMENTS

| | | |
|---|---|---|
| 4,100,601 A | 7/1978 | Kaufman et al. |
| 5,845,150 A | 12/1998 | Henion |
| 6,272,283 B1 | 8/2001 | Nguyen |
| 7,017,059 B2 | 3/2006 | Law et al. |
| 7,890,194 B2 | 2/2011 | Pannese |
| 8,006,104 B1 * | 8/2011 | Sivertsen ............ G06F 1/18 174/520 |
| 8,006,105 B1 | 8/2011 | Sivertsen |
| 8,102,845 B2 | 1/2012 | Glaros et al. |
| 8,806,074 B2 | 8/2014 | Ichieda |
| 8,830,996 B2 | 9/2014 | Glaros et al. |
| 8,909,384 B1 | 12/2014 | Beitelmal et al. |
| 9,563,582 B2 | 2/2017 | Glaros et al. |
| 9,767,046 B2 | 9/2017 | Glaros et al. |

(Continued)

*Primary Examiner* — Getente A Yimer
(74) *Attorney, Agent, or Firm* — Sterne, Kessler, Goldstein & Fox P.L.L.C.

(57) ABSTRACT

Systems, apparatus, and methods for a reconfigurable integrated system integrated onto a single circuit board are described herein. An embodiment includes a CPU host and microprocessor which attach and manage internal and external peripheral devices. Data received from sensors may include video data. Any data input may be routed by the system so as to be output at any display connected to the system. The enclosure of the integrated system may be a conformal heat sink design that enables a passively cooled system. The data may be in analog or digital format for output by the reconfigurable integrated system.

19 Claims, 8 Drawing Sheets

(56) References Cited

U.S. PATENT DOCUMENTS

| | | |
|---|---|---|
| 2002/0004860 A1 | 1/2002 | Roman |
| 2002/0060627 A1 | 5/2002 | Gaiser |
| 2003/0016636 A1 | 1/2003 | Tari et al. |
| 2005/0083197 A1 | 4/2005 | Glenn et al. |
| 2005/0120079 A1 | 6/2005 | Anderson et al. |
| 2005/0138674 A1 | 6/2005 | Howard et al. |
| 2006/0053316 A1 | 3/2006 | Yamazaki et al. |
| 2006/0064732 A1 | 3/2006 | Hirosawa et al. |
| 2006/0277343 A1 | 12/2006 | Lin et al. |
| 2007/0159314 A1* | 7/2007 | Zhu .................... B60C 23/0408 340/442 |
| 2007/0162261 A1 | 7/2007 | Notstrand et al. |
| 2007/0208262 A1 | 9/2007 | Kovacs |
| 2007/0245391 A1* | 10/2007 | Pont .................... H04N 7/17318 725/113 |
| 2007/0283001 A1 | 12/2007 | Spiess et al. |
| 2008/0195613 A1 | 8/2008 | Sumi et al. |
| 2008/0228968 A1 | 9/2008 | Aihara et al. |
| 2009/0018717 A1 | 1/2009 | Reed et al. |
| 2009/0204730 A1 | 8/2009 | Mochizuki |
| 2009/0276110 A1 | 11/2009 | Martinez et al. |
| 2009/0295993 A1 | 12/2009 | Chhokra |
| 2010/0026802 A1 | 2/2010 | Lipton et al. |
| 2010/0303068 A1 | 12/2010 | Glaros et al. |
| 2012/0113170 A1 | 5/2012 | Igarashi |
| 2012/0140777 A1 | 6/2012 | Glaros et al. |
| 2013/0061271 A1 | 3/2013 | Lu |
| 2013/0082673 A1 | 4/2013 | Sako |
| 2013/0098599 A1* | 4/2013 | Busch ................ H05K 7/20209 165/294 |
| 2013/0107054 A1 | 5/2013 | Ueoka et al. |
| 2015/0100706 A1 | 4/2015 | Glaros et al. |
| 2015/0278214 A1* | 10/2015 | Anand .............. G06F 17/30696 707/748 |
| 2016/0154748 A1 | 6/2016 | Glaros |

\* cited by examiner

MODULAR DEVICE, SYSTEM, AND METHOD FOR RECONFIGURABLE DATA DISTRIBUTION

CROSS-REFERENCE TO RELATED APPLICATION

This patent application is a continuation of U.S. application Ser. No. 14/046,030 filed Oct. 4, 2013, now allowed, which is herein incorporated by reference in its entirety.

BACKGROUND

Technical Field

The present disclosure relates generally to the integration of various networking functions into a single circuit board for a networked system to enable rapid integration and dynamically modifiable output to display devices.

Background

Specialized vehicles, such as armored vehicles, use comprehensive networked systems to enable the rapid "plug and play" of disparate subsystems within the vehicle. These networked systems seek to provide an "any data, any station" environment in which the data from any sensor associated with the vehicle may be output to any display associated with the vehicle—regardless of whether the different sensors or other inputs use standardized operating platforms or proprietary ones. To implement this functionality, these comprehensive networked systems have cobbled together commercial, off-the-shelf components with a few custom components using custom cabling harnesses.

The cobbling together of commercial components as well as custom components impedes production flow, complicates testing during development, and ultimately hinders the speed in which these comprehensive networked systems can reach the market. The design of the different components, as well as their interconnections, hinders efforts to reduce the physical footprint of the comprehensive networked systems within the vehicles. In addition, these systems have typically used active cooling components that have a lower mean-time-before-failure (MTBF) than solid state components. Accordingly, devices, methods, and systems are needed that overcome limitations with respect to the size, functionality, and speed to market for comprehensive networked systems, as well as other disadvantages.

BRIEF DESCRIPTION OF THE DRAWINGS/FIGURES

Figure 1:
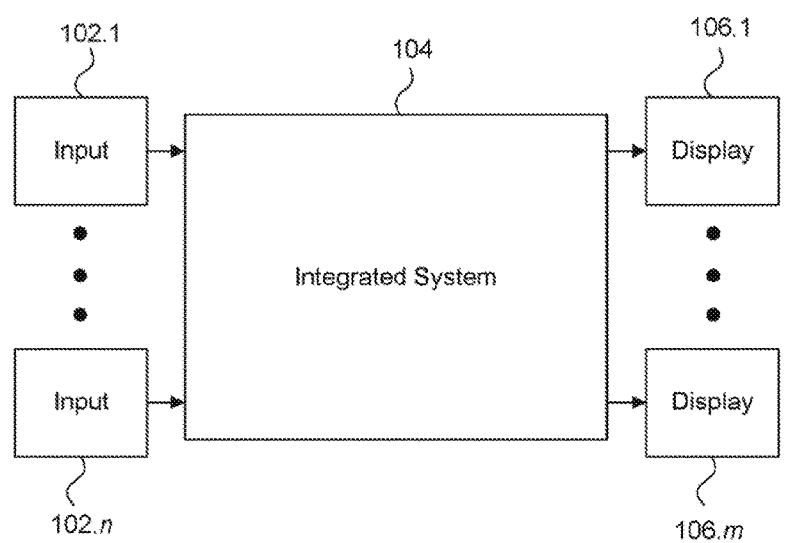
FIG. 1 is a diagram illustrating a modular device in a reconfigurable data distribution system, according to an embodiment.

The features and advantages of the present disclosure will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

While the present disclosure is described herein with reference to illustrative embodiments for particular applications, it should be understood that the disclosure is not so limited. Those skilled in the relevant art(s) will recognize additional modifications, applications, and embodiments within the scope thereof and additional fields in which the disclosure would be of significant utility.

System Overview

FIG. 1 illustrates an exemplary reconfigurable data distribution system 100, according to an embodiment. Exemplary reconfigurable data distribution system 100 is provided for the purpose of illustration and is not limiting of embodiments of the present disclosure. In an embodiment, the system 100 may be a version of an Electronic Keel (EKeel)® system. As shown in FIG. 1, system 100 includes a plurality of inputs 102.1 through 102.$n$, integrated system 104, and a plurality of displays 106.1 through 106.$m$. The plurality of inputs 102.1 through 102.$n$ may include temperature sensors, pressure sensors, velocity sensors, data loggers, image sensors, and/or cameras, just to name a few examples.

The inputs 102.1 through 102.$n$ may be mounted on motors or actuators that allow the system to position the inputs 102.1 through 102.$n$ based on prior feedback from data generated by the system or input by a user. The user may be a human. Alternatively, the user may be a computer or software application. In an embodiment, the request may be based on the user's browsing of a particular website, use of a cloud computing service, or some other remote application as will be understood by a person skilled in the relevant art(s). As just one example, inputs 102.1 through 102.$n$ may be mounted externally on an armored vehicle, such as a Mine Resistant Armor Protected (MRAP) vehicle. Other vehicle types relating to land, sea, or air are also with the scope of the present disclosure, as a person skilled in the relevant art(s) would appreciate. The disclosure is also applicable to any environment or application having multiple heterogeneous inputs and outputs. The inputs 102.1 through 102.$n$ provide data wirelessly or via wired connections to the integrated system 104.

The inputs 102.1 through 102.$n$ provide their collected data to the integrated system 104. For example, the inputs 102.1 through 102.$n$ may provide collected data in analog format for processing or routing by the integrated system 104. Alternatively, the collected data may be provided in digital form to the integrated system 104, as will be appreciated by those skilled in the relevant art(s). The integrated system 104 may receive the collected data from any one or more of the inputs 102.1 through 102.$n$ as streams of data, regardless of the operational platform of a particular input. As the data is received, if the data is in analog format, the integrated system 104 may convert it into data packets. In an embodiment, the data packets may be created according to the internet protocol, although other protocols may be used instead as will be recognized by those skilled in the relevant art(s).

In an embodiment, the integrated system 104 may be an integrated computer built on a single circuit board, such as a computer-on-module. In one example, the integrated system 104 may be designed based on the COM Express® specification hosted by the PCI Industrial Computer Manufacturers Group, for example the Type 6 specification. The Type 6 specification includes a pin out definition in the COM Express® specification, which may include up to 24 peripheral component interconnect (PCI) express lanes, 1 PCI Express Graphics (PEG) interface, 4 serial advanced technology attachment (SATA) ports, 1 local area network (LAN) port, 8 universal serial bus (USB) 2.0 ports, 4 USB 3.0 ports, and multiple display interfaces including video graphics adapter (VGA), low-voltage differential signaling (LVDS), PEG, and device driver interface (DDI). As will be recognized by those skilled in the relevant art(s), the Type 6 specification is just one example. Embodiments of the present disclosure may be implemented in other ways that incorporate the features onto a single circuit board with a similar form factor and range of capabilities.

The integrated system 104 may include one or more dedicated peripherals integrated on the same single circuit board to ensure computational reliability and enable additional monitoring and control of the overall system 100. The integrated system 104 may also include a dedicated microprocessor built on the same circuit board as the rest of the system. The dedicated microprocessor, such as dedicated microprocessor 210 that will be discussed in more detail below with respect to FIG. 2A, may be responsible for attaching and managing various peripherals to the system 100.

In an embodiment, the plurality of displays 106.1 through 106.m may be a plurality of touch screen monitors, or a mixture of touch screen and non-touch capable monitors, just to name a few examples. After receiving the data from the plurality of inputs 102.1 through 102.n and performing any necessary or requested processing on the data, the integrated system 104 may route the data some subset of the data, and/or additional data derived from the received data, to one or more of the plurality of displays 106.1 through 106.m. In operation, the system 100) may enable the viewing of any data source, for example any of inputs 102.1 through 102.n, at any display 106.1 through 106.m. The viewable data may be processed first by the integrated system 104, and/or be displayed as the original data (e.g., analog data) from the inputs 102.1 through 102.n.

The integration of the different computational and peripheral elements onto a single circuit board may significantly reduce the size of the overall system 100. Additionally, in an embodiment the system 100's enclosure may be a conformal heat sink design that enables a passively cooled system. In such an embodiment, the use of solid state parts instead of moving parts for cooling may advantageously increase the mean time before failure. Further, the integration of the computational and peripheral elements onto a single circuit board may enhance the production flow, simplify the testing process, and expedite the speed of these devices to market.
Integrated System 104

Figure 2A:
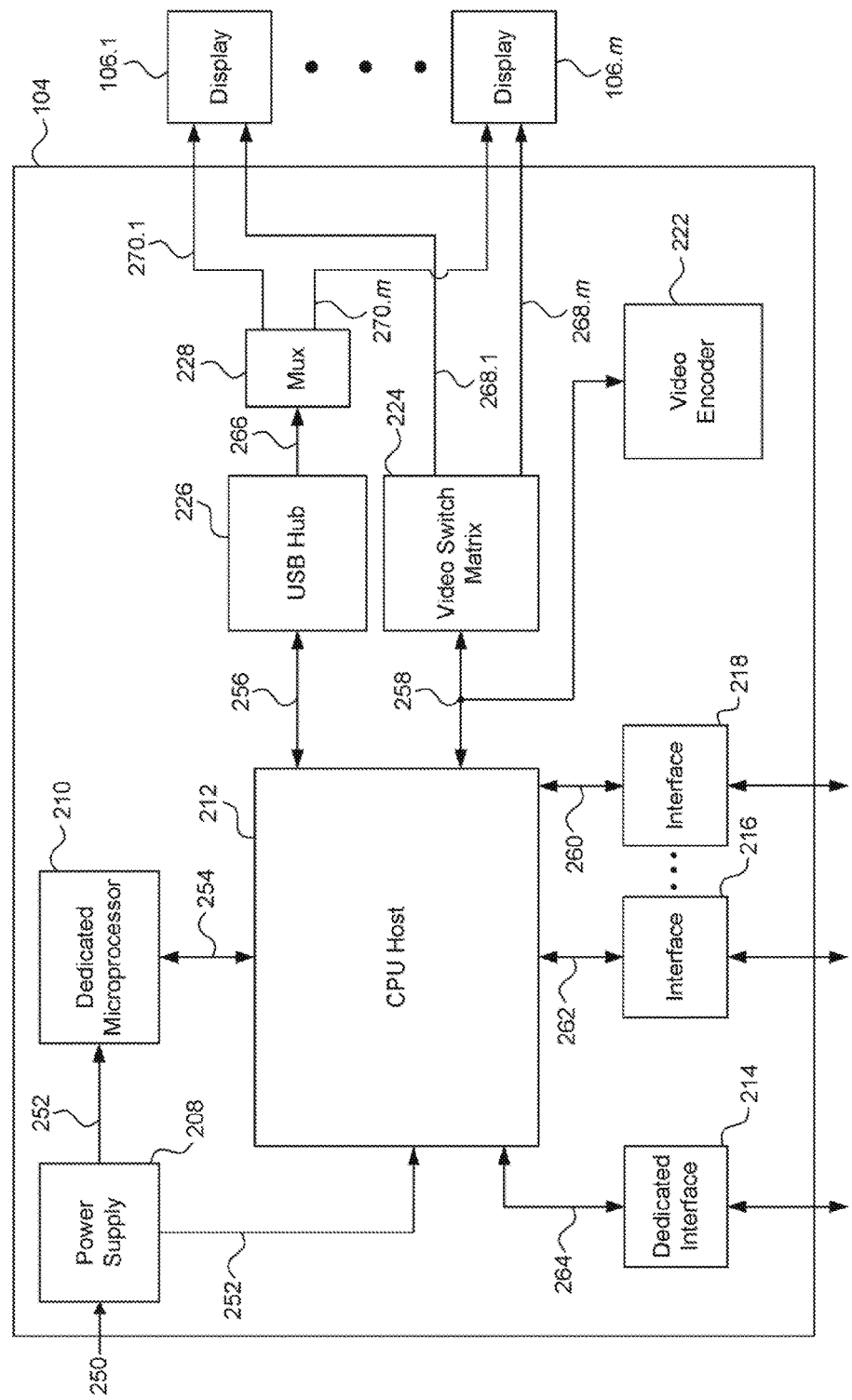
FIG. 2A is a diagram illustrating a modular device according to a first embodiment.

FIG. 2A illustrates a modular device, such as integrated system 104, according to a first embodiment. The integrated system 104 may include a power supply 208, a dedicated microprocessor 210, a central processing unit (CPU) host 212, a dedicated interface 214, a plurality of interfaces 216 through 218, a video encoder 222, a communication hub 224 and a switch matrix 226, and a multiplexer 228. As will be recognized by those skilled in the relevant art(s), embodiments here are described with the aid of functional building blocks illustrating the implementation of specified functions and relationships thereof. The boundaries of these functional building blocks have been arbitrarily defined for the convenience of the description. Alternate boundaries can be defined so long as the specified functions and relationships are appropriately performed.

In FIG. 2A, inputs 102.1 through 102.n may send and receive data via interfaces 214, 216, and 218. The dedicated interface 214 may be a USB device dedicated to serial communication. In an embodiment, the dedicated interface 214 may specifically be a FT4232 USB hi-speed integrated circuit, produced by Future Technology Devices International, Ltd. of Glasgow. United Kingdom. Other dedicated circuits may instead be used, as will be understood by those skilled in the relevant art(s). In such an embodiment, the dedicated interface 214 may include a controller area network (CAN) bus-based device, two RS232 serial devices, and at least one COM port to enable communication to the dedicated microprocessor 210. This enables a dedicated, uninterrupted command and control scheme for the integrated system 104. As will be recognized by those skilled in the relevant art(s), the dedicated interface 214 may include more or different interfacing devices as those indicated above.

The CAN bus-based device of dedicated interface 214 may be a dedicated CAN controller that operates at or around 500 Kbits/second, although other speeds may be possible as will be recognized by those skilled in the relevant art(s). The CAN controller may communicate via a CAN data bus, for example a CAN 2.0B specification-compliant data bus. Dedicated software for the CAN data bus, as well as for the dedicated COM port, may allow a full J1939 configurable interface for vehicle applications. In an embodiment, the CAN data bus may be used primarily for vehicle data diagnostics and health monitoring.

The two RS232 serial devices of dedicated interface 214 may enable the attachment of additional serial peripheral devices to the integrated system 104. In an embodiment, the two RS232 serial devices are dedicated to the CPU host 212 via the dedicated interface 214. As will be recognized by those skilled in the relevant art(s), fewer or more than two RS232 serial devices may be implemented.

Interfaces 216 and 218 may represent one or more interfaces to one or more corresponding peripheral devices. Although only two interfaces are shown, a person skilled in the relevant art(s) will recognize that additional or fewer interfaces may be implemented for communication with additional or fewer peripheral devices. Interface 216 may be, for example, an Ethernet switch interface. For simplicity of discussion, reference to interface 216 will be with respect to an Ethernet switch interface 216, although other components may be used instead. The Ethernet switch interface 216 may be integrated on the same circuit board as the other circuits within integrated system 104, such as with the backplane, thereby reducing design costs and constraints. Integration of an Ethernet switch removes the necessity of an external Ethernet switch for networking IP-based devices together to the system 100. The Ethernet switch may support various Ethernet speeds, for example a gigabit speed. Other speeds, both faster and slower, are envisioned as will be recognized by those skilled in the relevant art(s).

Interface 218 may be an interface for any other peripheral device input 102.1 through 102.n that provides a data stream to the integrated system 104, for example temperature sensors, pressure sensors, velocity sensors, data loggers, image sensors, and/or cameras. Interfaces 214, 216, and 218 may communicate with the CPU host 212 via signal paths 264, 262, and 260, respectively. Signal paths 264, 262, and 260 may be single traces or buses.

CPU host 212 is the central component of the integrated system 104 and serves as the primary host for all attached peripherals, whether integrated or external to the integrated system 104. As indicated above, the CPU host 212 may be, for example, implemented according to the motherboard standards in the COM Express specification. In one embodiment, the CPU host 212 may be implemented as a Type 6 COM Express board.

The dedicated microprocessor 210 may be responsible for attaching and managing various peripherals to the system 100. In an embodiment, the dedicated microprocessor 210 may manage the programming of the low-level circuitry of the integrated system 104. The dedicated microprocessor 210 may serve as the gateway for enabling two or more integrated systems 104 to connect and share information, for example across a Xlink interface as will be discussed in more detail below with respect to FIGS. 2B and 3. The dedicated microprocessor 210 may send and receive messages with the CPU host 212 via data bus 254.

In an embodiment, the dedicated microprocessor 210 may be based on a Microprocessor without Interlocked Pipeline Stages (MIPS) architecture and programmable using the C programming language. Additionally or alternatively, the dedicated microprocessor 210 may be a specific, non-time-dependent state machine that is deterministic. The code which the dedicated microprocessor 210 executes may, for example, run and execute from a boot loader. This enables expandability when deployed in the field without requiring physical programming.

The CPU host 212 may output data for display at one or more of the plurality of displays 106.1 through 106.m via one or more of communication hub 226 and switch matrix 224. For sake of simplicity, this discussion will refer to communication hub 226 as USB hub 226 and switch matrix 224 as video switch matrix 224. As will be understood by those skilled in the relevant art(s), other types of hubs and matrixes are possible. The USB hub 226 may communicate with the CPU host 212 via USB bus 256. The USB bus 256 may enable the dedicated microprocessor 210 to attach additional USB input devices or output devices to the CPU host 212, depending on how user or situational requirements change over time. In an embodiment, the USB hub 226 may output data to one or more of the plurality of displays 106.1 through 106.m via a multiplexer 228, which receives data signal 266 from the USB hub 226 and outputs USB output signals 270.1 through 270.m to one or more of the displays.

Any USB input may be output to any display 106.1 through 106.m. In an example, the data input from any input from among inputs 102.1 through 102.n may be routed to any display 106.1 through 106.m. The data input is not necessarily only video data. According to embodiments of the present disclosure, any data input may be routed to any data output. In one example, that input may be video data. The input may additionally or alternatively be radar data. LIDAR data, radio data, etc.

The video switch matrix 224 may communicate with the CPU host 212 via video bus 258. The video switch matrix 224 may be a bus matrix that enables the implementation and display of video sources and routing of analog video sources. In an embodiment, the video switch matrix 224 may enable the implementation and display of VGA sources, for example 3 sources. More or fewer sources are possible, as will be recognized by those skilled in the relevant art(s). These sources may be the CPU processor of the CPU host 212, another integrated system 104 discussed with respect to FIG. 2B below, and another that has been ported out to a MIL-Circ header used for displaying of an external source. Using the video switch matrix 224, any video input may be output to any of the plurality of displays 106.1 through 106.m. The video switch matrix 224 determines what to output to each display 106.1 through 106.m. In an embodiment, the video switch matrix 224 is fully digital and integrated, cycling millions of times a second to enable each display to be reconfigurable on-the-fly.

The video bus 258 may be programmable and adjustable. In an embodiment, the video bus 258 may be a keyboard-video-mouse (KVM) style bus. The keyboard and mouse devices may be additional peripherals that may be controlled by the CPU host 212 and/or the dedicated microprocessor 210, as discussed above.

The video switch matrix 224 may also enable the routing of data from a plurality of analog video sources to a plurality of analog outputs, such as one or more of the displays 106.1 through 106.m. In one embodiment, the integrated system 104 may receive up to four analog video inputs, for example as a subset of the plurality of inputs 102.1 through 102.n. As will be recognized by those skilled in the relevant art(s), the integrated system 104 may be capable of receiving more video inputs. As will be discussed with respect to FIG. 2B below, two or more integrated systems 104 may be attached together via one or more data paths, enabling the attachment of additional video sources, such as analog video inputs, for routing to the plurality of displays 106.1 through 106.m.

In an embodiment, the video bus 258 may also route the plurality of analog video inputs to the video encoder 222. The video encoder 222 may be any type of video server that is capable of capturing analog video data and converting the analog signal(s) into digital video streams. The video encoder 222 may be attached to the CPU host 212 and be PCI or PCIe-based. Once analog video data is captured by the video encoder 222, it may be shared digitally throughout the system 100, for example using IP, and displayed on computer monitors instead of only analog monitors via the video switch matrix 224. The video encoder 222 may include one or more analog video inputs, for example received from the video bus 258. In an embodiment, the video encoder 222 may be able to receive up to 4 analog video signals for conversion into digital video streams, although more signals may be converted as will be recognized by those skilled in the relevant art(s).

The video encoder 222 may also include a dedicated processor for encoding analog video data based on a compression format, and for performing video analysis. Alternatively or in addition, some or all of the processing may occur at the CPU host 212 and/or the dedicated microprocessor 210. The video encoder 222 may detect and process various analog formats, including the national television system committee (NTSC) and phase alternating line (PAL) formats. As will be recognized by those skilled in the relevant art(s), other video signal formats may also be used.

The video encoder 222 may also include a dedicated memory for storing the device's operating instructions and for buffering purposes. The video encoder 222 may also include its own dedicated input and output interfaces, for example a dedicated Ethernet port for sending and receiving digital data and/or an RS232 port to assist in controlling the functionality of one or more analog video sources. Additionally or alternatively, the video encoder 222 may use the interfaces 214, 216, and 218 to communicate with one or more of the plurality of inputs 102.1 through 102.n.

In an embodiment, the video bus 258 includes both the VGA and analog video data. In an alternative embodiment, the video bus 258 may be composed of two distinct busses for each of the VGA and analog data respectively.

The power supply 208 may supply the different power needs of all of the devices integrated with integrated system 104. The power supply 208 may receive power input 250, for example from a MIL-STD power interface provided in military vehicles. As will be recognized those skilled in the relevant art(s), the power supply 208 may receive power input 250 from other sources in addition to, or instead of, a MIL-STD power interface in a military vehicle. The power supply 208 will be addressed in more detail below with respect to FIG. 3.

The different components integrated on the same circuit board in integrated system 104 have very short signal paths to each other and particularly to the CPU host 212, which results in a reduction of information loss. The integrated system 104 overall has a small form factor. For example, the integrated system 104 may have a width (x-dimension) of less than 10 inches, such as 9.25 inches, as well as a length (y-dimension) of around 6 inches, and depth (z-dimension) of less than 1 inch, such as 0.093 inches. In one embodiment, the integrated system may have 12 total layers. These are examples only, and one skilled in the relevant art(s) would recognize that other dimensions and combinations are possible without departing from the scope of the present disclosure.

Figure 2B:
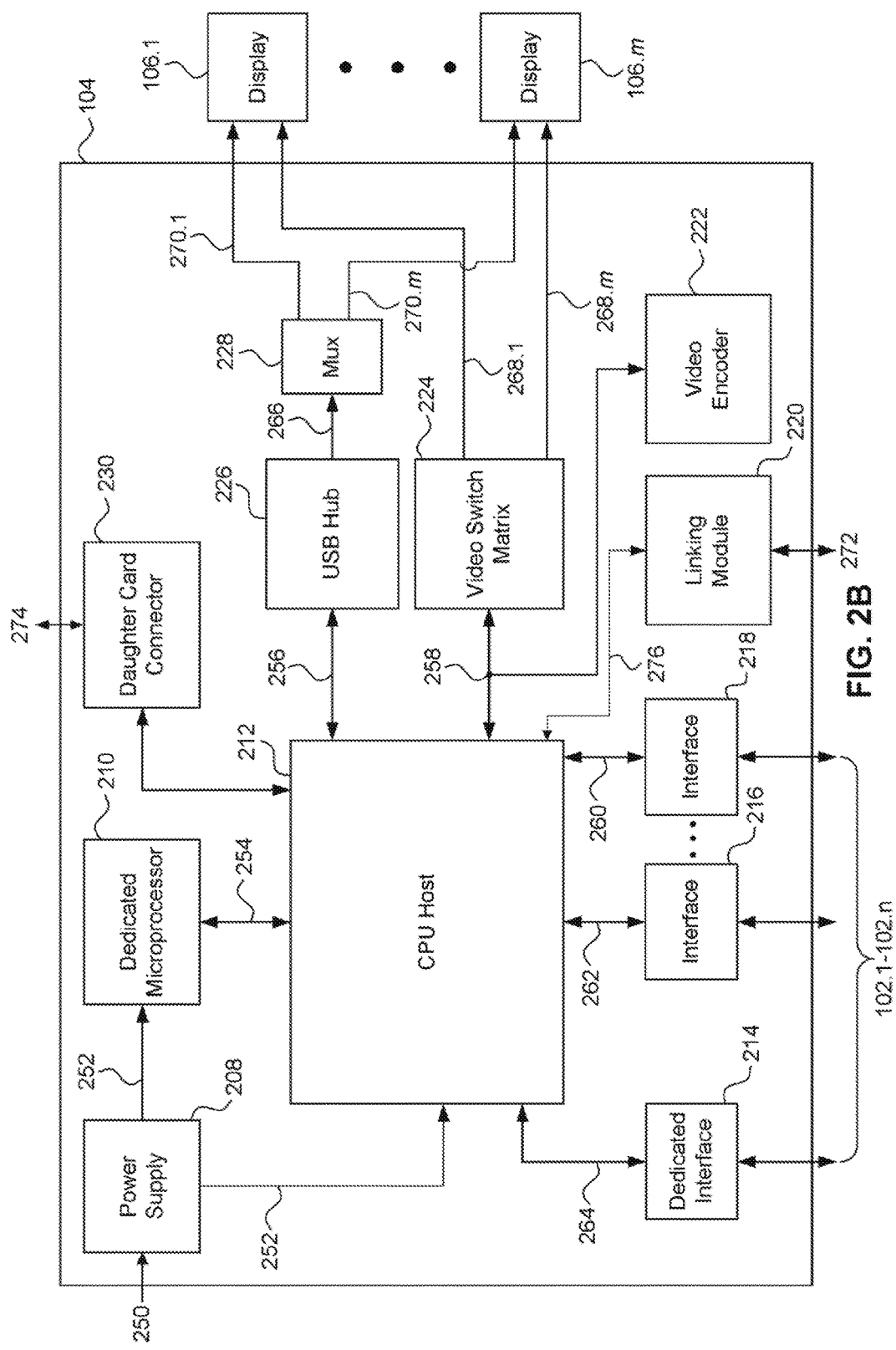
FIG. 2B is a diagram illustrating a modular device according to a second embodiment.

FIG. 2B illustrates a modular device, such as integrated system 104, according to a second embodiment. For sake of simplicity, only those elements that are different from the elements discussed above with respect to FIG. 2A will be addressed. The integrated system 104 of FIG. 2B additionally includes a linking module 220 and a daughter card connector 230.

The linking module 220 may be, for example, an XLink that enables the connecting of two or more integrated systems 104. In an embodiment, the dedicated microprocessors 210 of two integrated systems 104 may share information via the linking module 220. The data from inputs to one integrated system 104 may be routed as connection signal 272 via the linking module 220 to the second integrated system 104 for output at a display connected to the second integrated system, and vice versa. In one example, that data may be analog video data, VGA video data, or data from other video or non-video inputs from among the plurality of inputs 102.1 through 102.n.

In further support of the linking module 220's interface, an Ethernet cable may be attached to the Ethernet switch interface 216 for added bandwidth data sharing between the first integrated system 104 and the second integrated system 104. In embodiments where there are multiple integrated systems 104 connected, for example via linking module 220, the second integrated system 104 may operate to attach one or more peripherals to the first integrated system 104, and vice versa.

Daughter card connector 230 may provide an interface for the integrated system 104 to enable attachment of a daughter card to the integrated system 104 to further improve upon the system 100's dimensions and form factor. In an embodiment, the daughter card connector 230 may enable additional peripheral device(s) to connect via a daughter card so that the additional peripheral device(s) are parallel to the integrated system 104's circuit board, rather than perpendicular.

Power Supply

Figure 3:
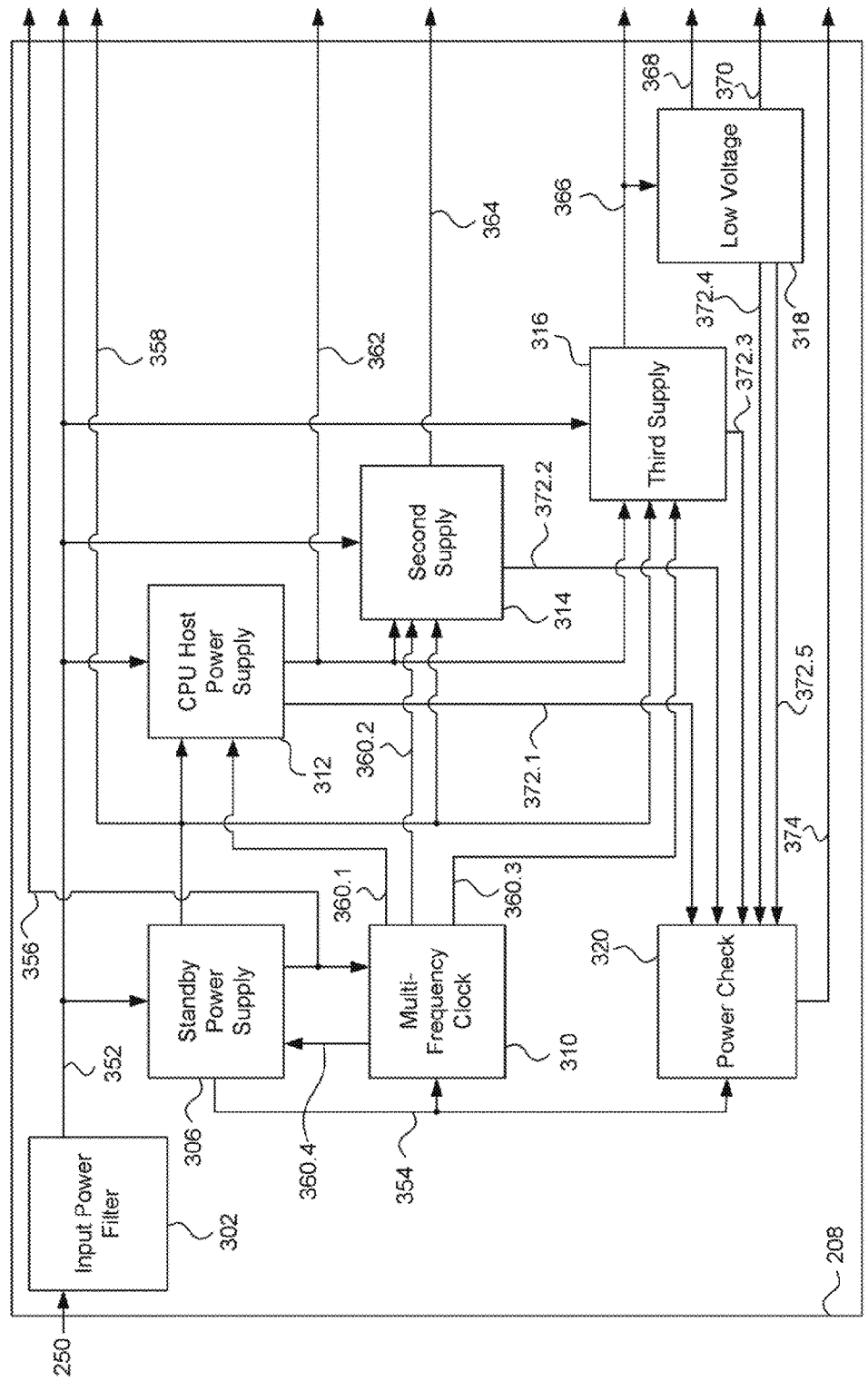
FIG. 3 is a diagram illustrating a power supply of an exemplary modular device according to an exemplary embodiment.

FIG. 3 provides a diagram illustrating the power supply 208 of an exemplary integrated system 104 according to an exemplary embodiment. The power supply 208 may be a power system customized from the Advanced Technology eXtended (ATX) specification. The power supply 208 may be able to continuously operate off of a range of voltage input values, for example ranging from a 6.5V to a 42V power input 250 and output the standard voltages of 12V, 5V, 3.3V, −5V, and standby 5V and 3.3V. Power input 250, for example from a MIL-STD power interface, may first be filtered by input power filter 302. In an embodiment, input power filter 302 may include a common mode filter that provides noise reduction as well as immunity to the changing power-noise environments in which the integrated system 104 may be found. A first input voltage 352 may be routed to multiple voltage supply circuits, for example a standby power supply 306, CPU host power supply 312, a second supply 314, and a third supply 316.

The standby power supply 306 may receive the first input voltage 352 and output, in response, a first standby voltage 356, a second standby voltage 358, and a standby-good signal 354. In an embodiment, the standby power supply 306 may also be connected to a switch circuit (not shown) that may control a run signal in the standby power supply 306. When the switch circuit is short circuited, or "on," it may pull the run signal above a minimum voltage, for example 1.2V. When the switch circuit is "off," the run signal may be at ground. This is reflected in the standby voltages 356 and 358, as will be addressed below. In an embodiment, the first standby voltage may be 3.3V and the second standby voltage 358 may be 5V. Although other voltage values are possible, as will be recognized by one skilled in the relevant art(s), these particular voltage values will be used for sake of simplicity in this discussion. The 5V standby voltage 358 may be output to the rest of the integrated system 104, as well as input into each of the other power supplies 312, 314, and 316, and the power check circuit 320. The 3.3V standby voltage 356 may be output to the rest of the integrated system 104 and input into the power check circuit 320 and the multi-frequency clock 310.

The multi-frequency clock 310 may receive as inputs the 3.3V standby voltage 356 and the standby-good signal 354. The multi-frequency clock 310 is designed to provide multiple clock signals, at the same or different frequencies, to the other circuits within the power supply 208. As will be recognized by those skilled in the relevant art(s), there are many ways to implement the multi-frequency clock 310 which fall within the scope of this disclosure. In an embodiment, the multi-frequency clock 310 outputs clock signals 360.1 through 360.4, although any other number may be output as is understood. The clock signal 360.1 may be output to the CPU host power supply 312. The clock signal 360.2 may be output to the second supply 314, and the clock signal 360.3 may be output to the third supply 316. The clock signal 360.4 may be output to the standby power supply 306. The multi-frequency clock 310 may also provide synchronization, for example to reduce jitter in the clock signals 360.1 through 360.4.

The CPU host power supply 312 may receive as inputs the first voltage input 352, the 5V standby voltage 358, and the clock signal 360.1. The 5V standby voltage 358 may operate as an on/off signal for the CPU host power supply 312, for example corresponding to when the run signal is "on" and "off." The CPU host power supply 312 may provide a first output power voltage 362. The first output power voltage 362 is output to the integrated system 104 for use by other circuits, components, and peripherals, as well as fed to the second supply 314 and the third supply 316. In an embodiment, the first output power voltage 362 may be a 12V power signal, in accordance with the ATX specification. The CPU host power supply 312 may also output a CPU host power supply good signal 372.1 to the power check circuit 320.

The second supply 314 may receive as inputs the first voltage 352, the 5V standby voltage 358, the clock signal 360.2, and the first output power voltage 362. The 5V standby voltage 358 may also operate as an on/off signal for the second supply 314. The second supply 314 may provide a second output power voltage 364, which is output to the integrated system 104 for use by other circuits, components, and peripherals. In an embodiment, the second output power voltage 364 may be a 5V power signal, in accordance with the ATX specification. The second supply 314 may also output a second supply good signal 372.2 to the power check circuit 320.

The third supply 316 may receive as inputs the first voltage 352, the 5V standby voltage 358, the clock signal 360.3, and the first output power voltage 362. The 5V standby voltage 358 may also operate as an on/off signal for the third supply 316. The third supply 316 may provide a third output power voltage 366, which is output to the integrated system 104 for use by other circuits, components, and peripherals, as well as by the low voltage supply 318. In an embodiment, the third output power voltage 366 may be a 3.3V power signal, in accordance with the ATX specification. The third supply 316 may also output a third supply good signal 372.3 to the power check circuit 320.

The low voltage supply 318 may receive as input the third output power voltage 366. The low voltage supply 318 may provide the power system support required by different dedicated peripherals in the integrated system 104, for example Ethernet switch interface 216 of FIGS. 2A and 2B. The low voltage supply 318 may output first low voltage 368 and second low voltage 370 to the integrated system 104 for use by the circuits, components, and/or peripherals that require low voltage support. The low voltage supply 318 may also output a fourth supply good signal 372.4 and a fifth supply good signal 372.5 to the power check circuit 320.

The power check circuit 320 may receive as inputs the 3.3V standby voltage 356, the standby-good signal 354, the CPU host power supply good signal 372.1, the second supply good signal 372.2, third supply good signal 372.3, and fourth and fifth supply good signals 372.4 and 372.5. The power check circuit 320 determines whether the outputs of the different supplies within power supply 208 are stable and adequate for use outside of the power supply 208.

In operation, the power supply 208 may continuously operate off of a range of voltage input values, for example ranging from a 6.5V to a 42V power input 250 and output the standard voltages of 12V, 5V, 3.3V, −5V, and standby 5V and 3.3V according to the ATX specification.

Scaled System 400

Figure 4:
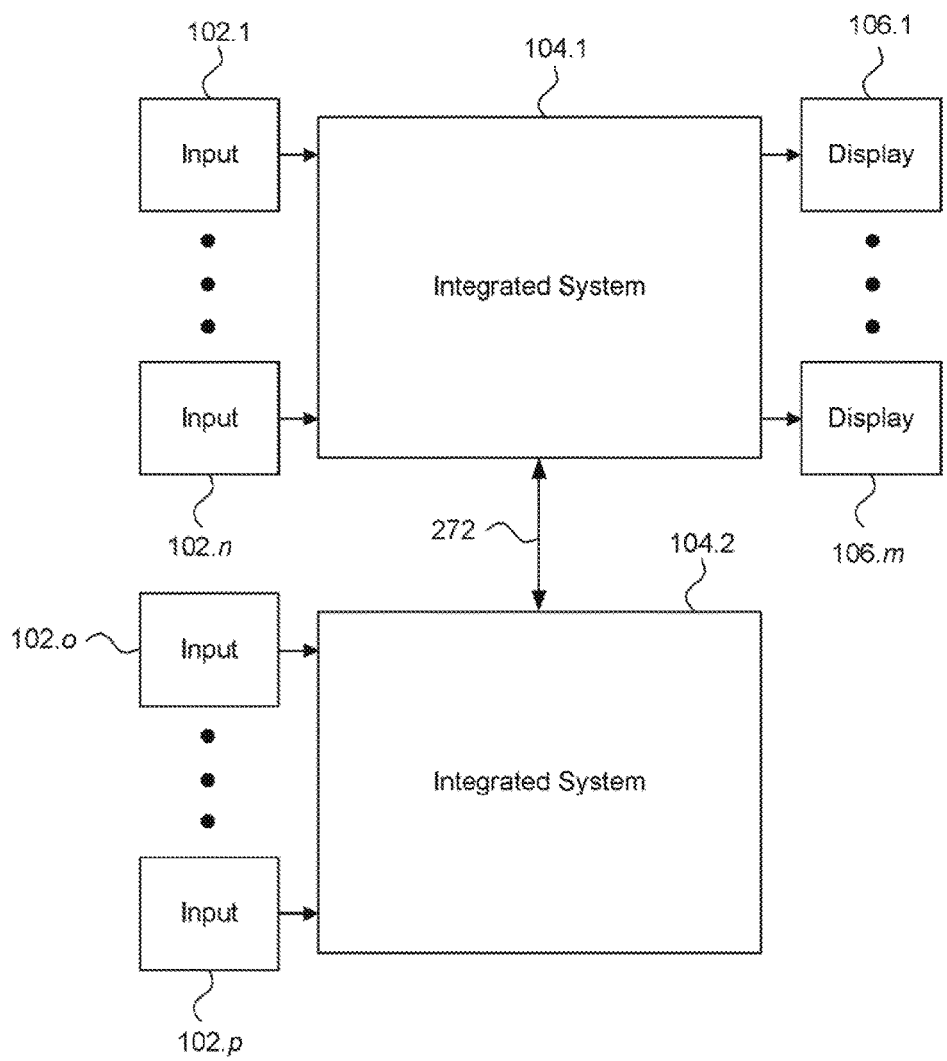
FIG. 4 is a diagram illustrating multiple modular devices in a reconfigurable data distribution system, according to an exemplary embodiment.

In FIG. 4, multiple integrated system environment 400 is illustrated, according to an exemplary embodiment. For purposes of discussion, only those elements that differ, or are in addition to, the elements discussed above with respect to FIGS. 2A and 2B will be addressed. Multiple integrated systems 104.1 and 104.2 are shown in FIG. 4, connected together using connection signal 272 which may be a cable or wireless connection, for example. Although two integrated systems 104.1 through 104.2 are shown in FIG. 4, those skilled in the relevant art(s) will recognize more than two may be combined to increase the functionality of the overall multiple integrated system environment 400. The environment 400 may still include the plurality of inputs 102.1 through 102.$n$, and plurality of displays 106.1 through 106.$m$.

In an embodiment, the plurality of inputs 102.1 through 102.$n$ are a first plurality of inputs attached to the first integrated system 104.1. A second plurality of inputs 102.$o$ through 102.$p$ may be attached to the second integrated system 104.2. This situation may arise, for example, where there are more inputs than a single integrated system 104 may receive, or where additional processing power is desired. Any from the first plurality of inputs 102.1 through 102.$n$ and the second plurality of inputs 102.$o$ through 102.$p$ may be output to any of the displays 106.1 through 106.$m$. Although shown in FIG. 4 as being attached to only integrated system 104.1, there may be additional displays attached to integrated system 104.2, and any input may still be output to any display attached to either integrated system.

The combination of multiple integrated systems 104 may significantly improve processing performance while still maintaining a small form factor. Additionally, in an embodiment the integrated systems 104.1 and 104.2 in environment 400 may be enclosed in a conformal heat sink design that enables passive cooling. The integration of the computational and peripheral elements onto a single circuit board in each integrated system 104.1 and 104.2 may enhance the production flow, simplify the testing process, and expedite the speed of these devices to market, as well as add scalability and bandwidth by the combination of multiple integrated systems.

Exemplary Methods

Figure 5:
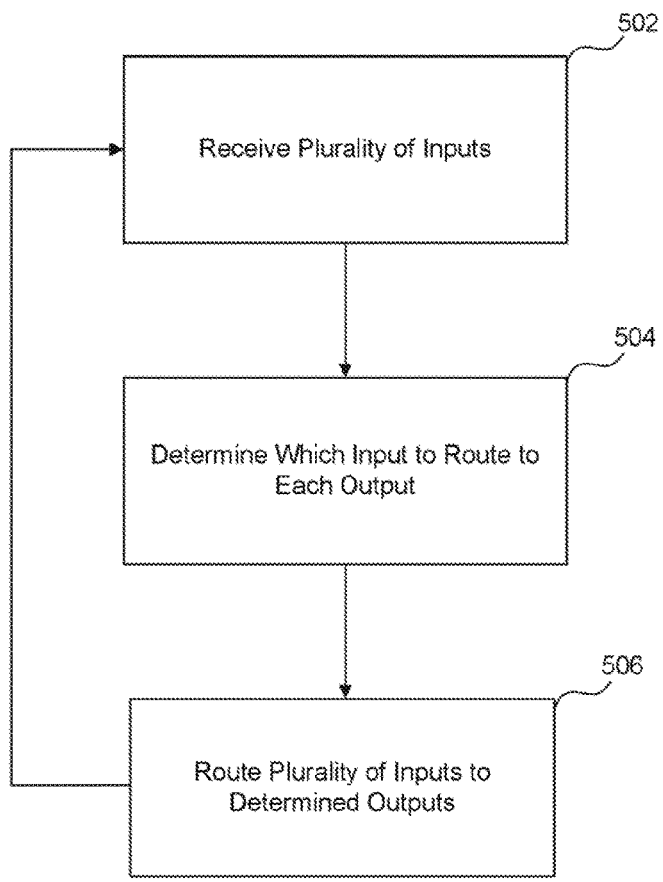
FIG. 5 is a flowchart illustrating an operation of a video switch matrix, according to an embodiment.

FIG. 5 illustrates a flowchart of method 500, an operation of a video switch matrix, according to an embodiment. For example, the video switch matrix may be video switch matrix 224 of FIGS. 2A and 2B above.

At step 502, the video switch matrix 224 receives a plurality of inputs, for example from inputs 102.1 through 102.$n$. The plurality of inputs 102.1 through 102.$n$ may be routed to the video switch matrix 224 via the video bus 258, as discussed above.

At step 504, the video switch matrix 224 determines which input from among the plurality of inputs 102.1 through 102.$n$ to route to which of the displays 106.1 through 106.$m$. The video switch matrix 224 may be reprogrammed many times in a short period of time, for example millions of times in a given second, to enable on-the-fly reconfigurable capabilities to the displays 106.1 through 106.$m$. As a result, each display 106.1 through 106.$m$ may, from the point of view of a user, immediately change what is displayed based on the constant reprogramming within the video switch matrix 224.

At step 506, the inputs are output to one or more of the displays 106.1 through 106.$m$ via video output signals 268.1 through 268.$m$. As a result, any input to the integrated system 104 may be output to any display.

Figure 6:
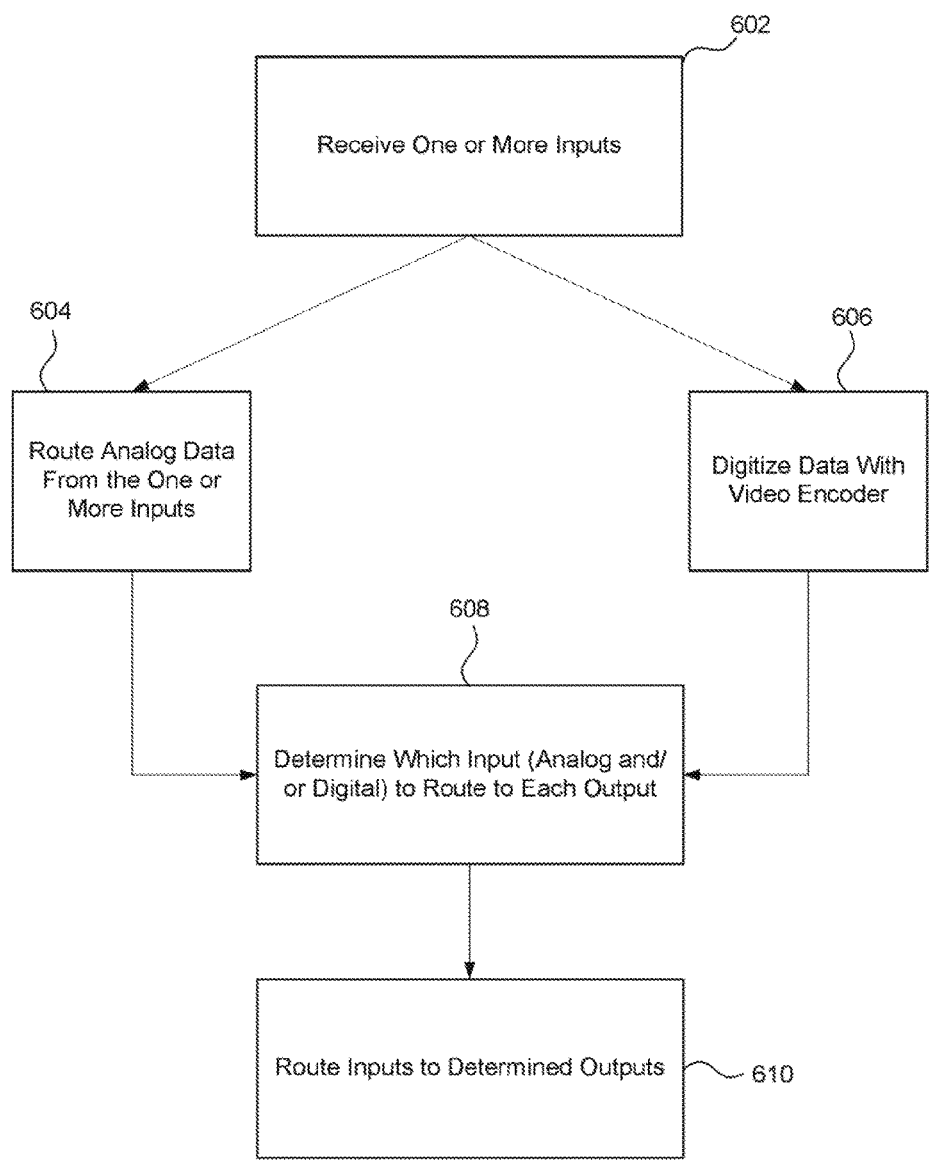
FIG. 6 is a flowchart illustrating an operation of a modular device, according to an embodiment.

FIG. 6 is a flowchart illustrating an operational flow 600 of a modular device, such as integrated system 104, according to an embodiment.

At step 602, the integrated system 104 receives a plurality of inputs, for example from inputs 102.1 through 102.$n$ that have been attached to the integrated system 104.

When the integrated system 104 receives data inputs, the integrated system 104 routes the data internally either in its native format or in a digitized format, for example after conversion by the video encoder 222. This is depicted in steps 604 and 606. At step 604, after the microprocessor 210 has managed the attachment of the peripheral providing the data input, the data may be routed internally in its native format, for example when the data input is an analog video source. If instead the data is to be converted, it is routed to the video encoder 222 and digitized at step 606.

At step 608, whether the integrated system 104 is routing analog or digital data corresponding to the inputs 102.1 through 102.n, the video switch matrix 224 determines which input to route to which display 106.1 through 106.m when the data is video data, as discussed above with respect to FIG. 5. The US hub determines which USB input to route to which display 106.1 through 106.m as well.

At step 610, the inputs 102.1 through 102.n are output to one or more of the displays 106.1 through 106.m. In this manner, any input may be output to any display and be reconfigurable on the fly.

Exemplary Computer System

Figure 7:
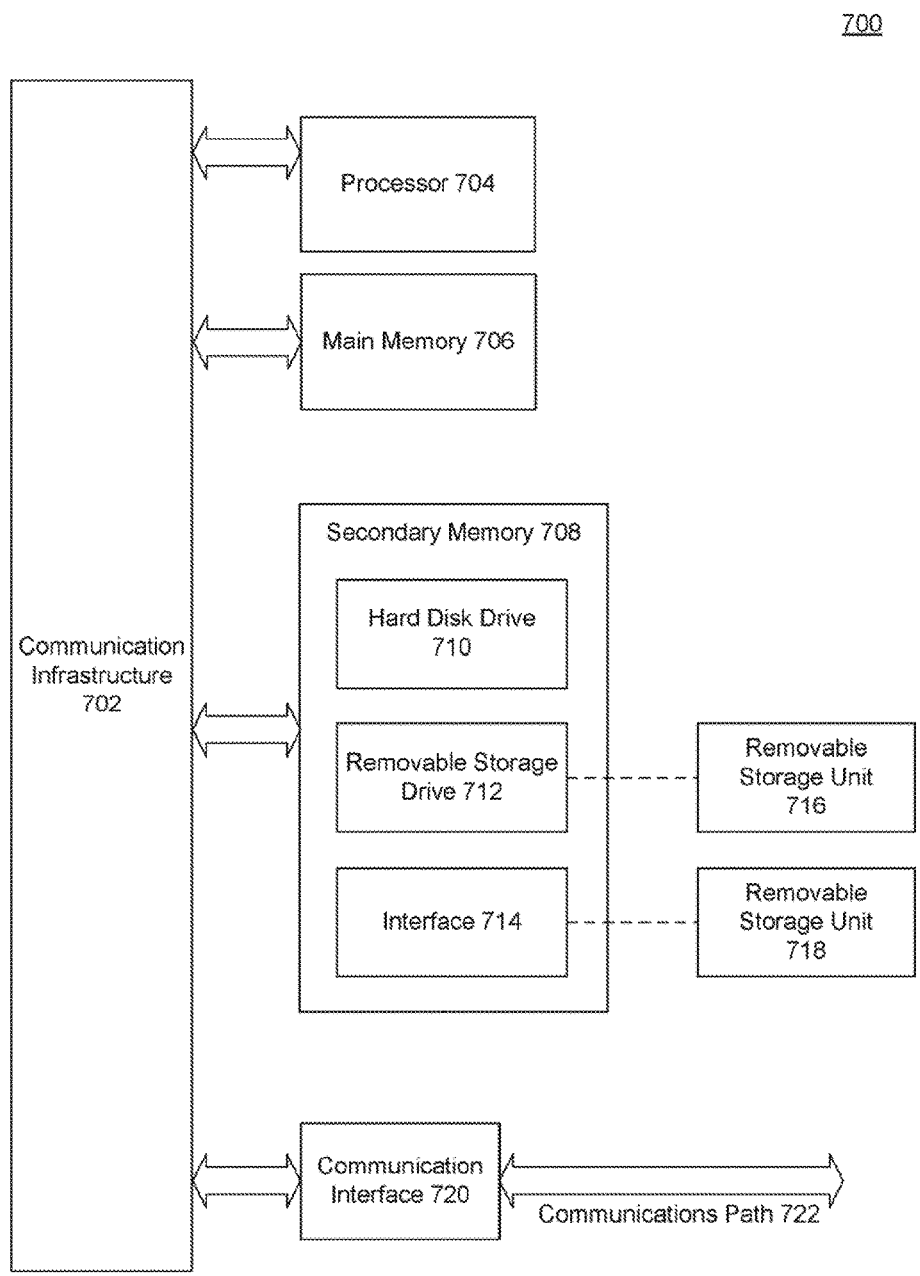
FIG. 7 illustrates an exemplary computer system that can be used to implement aspects of embodiments.

Embodiments of the present disclosure can be implemented in hardware, software or as a combination of software and hardware. Consequently, embodiments of the disclosure may be implemented in the environment of a computer system or other processing system. An example of such a computer system 700 is shown in FIG. 7. Embodiments described in the previous figures, for example the integrated system 104 in FIGS. 1-4, may execute on one or more computer systems 700. Furthermore, each of the steps of the processes depicted in FIGS. 5 and 6 can be implemented on one or more computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, flash memory, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700) and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
    a central processing unit (CPU) configured to receive video data from a plurality of input devices;
    a video switch matrix communicatively coupled to the CPU, wherein the video switch matrix is configured to route the video data from any one of the plurality of input devices to any one of a plurality of display devices based on a periodic reprogramming of the video switch matrix;
    a dedicated microprocessor coupled to the CPU and configured to manage the plurality of input devices; and
    a power supply system configured to provide a plurality of power signals to the CPU, the video switch matrix, the dedicated microprocessor, and the plurality of input devices.

2. The system of claim 1, further comprising a conformal heat sink configured to provide passive cooling to the system.

3. The system of claim 1, wherein the system comprises a computer-on-module embedded computer system.

4. The system of claim 1, wherein the power supply comprises a solid state power system.

5. The system of claim 1, wherein the power supply system is further configured to:
    operate between a 6.5V and a 42V input supply; and
    output a 12V supply, a 5V supply, a 3.3V supply, a negative 5V supply, a standby 5V supply and a standby 3.3V supply.

6. The system of claim 1, wherein the power supply comprises a common mode filter configured to reduce noise and provide immunity to changing power environments.

7. The system of claim 1, wherein the power supply is configured to receive a variable voltage input via a MIL-STD power interface on a vehicle.

8. The system of claim 1, wherein the system comprises:
    an x-dimension of less than 10 inches;
    a y-dimension of less than 6 inches; and
    a z-dimension of less than 0.1 inches.

9. The system of claim 1, wherein the system is based on a COM Express specification.

10. The system of claim 1, and the CPU is further configured to convert the video data from the plurality of input devices to data packets based on an Internet Protocol (IP).

11. The system of claim 1, wherein the dedicated microprocessor is based on a Microprocessor without Interlocked Pipeline Stages (MIPS) architecture, and the power supply system is based on an Advanced Technology eXtended (ATX) specification.

12. The system of claim 1, wherein:
    the video switch matrix is coupled to a Video Graphics Array (VGA) video bus and an analog video bus;
    the VGA video bus is configured to route a plurality of VGA signals from the video data; and
    the analog video bus is configured to route a plurality of analog video signals from the video data.

13. The system of claim 1, wherein the system further comprises:
    a daughter circuit board configured to provide a small form factor interface for one or more of the plurality of input devices.

14. The system of claim 1, wherein the CPU, the video switch matrix, the dedicated microprocessor, and the power supply are integrated with a backplane of a single circuit board.

15. The system of claim 1, further comprising:
    a linking module configured to connect the system with an additional system;
    an Ethernet switch interface configured to communicate with an Internet Protocol (IP) network; and
    a Universal Serial Bus (USB) bus configured to attach the plurality of input devices or the additional system.

16. The system of claim 15, wherein the CPU, the video switch matrix, the dedicated microprocessor, the power supply, the linking module, the Ethernet switch interface, and the USB bus are integrated with a backplane of a single printed circuit board.

17. The system of claim 1, wherein the video switch matrix is further configured to route the video data to a video encoder; and
    the video encoder is configured to capture analog video signals from the video data.

18. The system of claim 17, wherein any analog video signal from the analog video signals that the video encoder captures may change at any time to any other analog video signal from the video data.

19. A device, comprising:
    a central processing unit (CPU) configured to receive video data from a plurality of input devices;
    a video switch matrix communicatively coupled to the CPU, wherein the video switch matrix is configured to route the video data from any one of the plurality of input devices to any one of a plurality of display devices based on a periodic reprogramming of the video switch matrix;
    a dedicated microprocessor coupled to the CPU and configured to manage the plurality of input devices and the plurality of display devices, and attach the plurality of input devices or the plurality of display devices to the CPU via a boot loader; and
    a power supply system configured to provide a plurality of power signals to the CPU, the video switch matrix, the dedicated microprocessor, and the plurality of input devices.

* * * * *